Aug. 24, 1943.    F. G. PURINTON    2,327,555
FASTENER
Filed Aug. 29, 1942    2 Sheets-Sheet 1
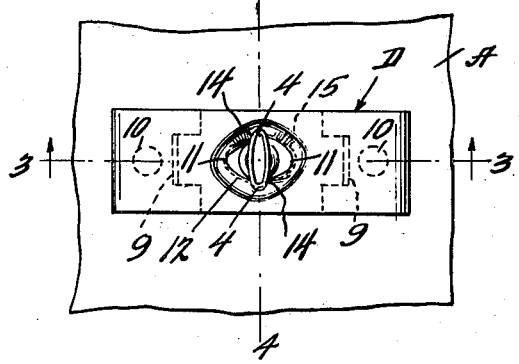
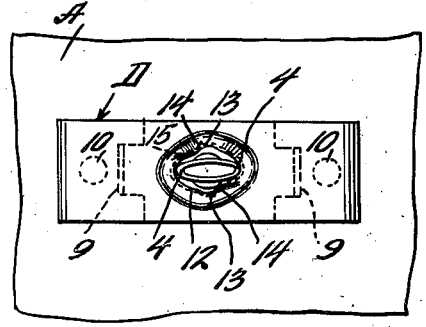
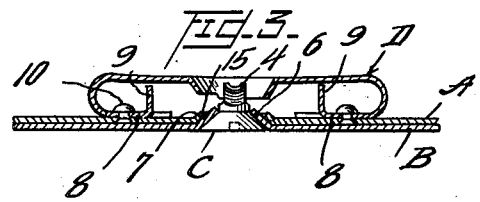
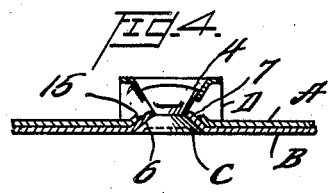
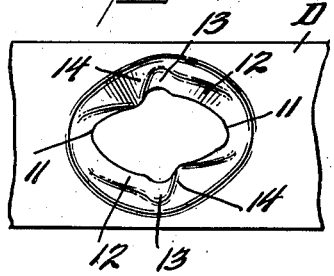
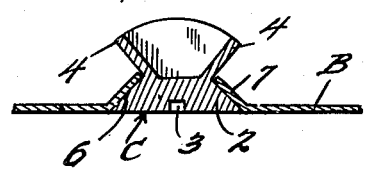
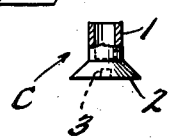
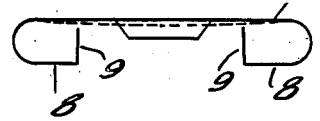
Inventor
Forrest G. Purinton,
By Parker Cook.
Attorney

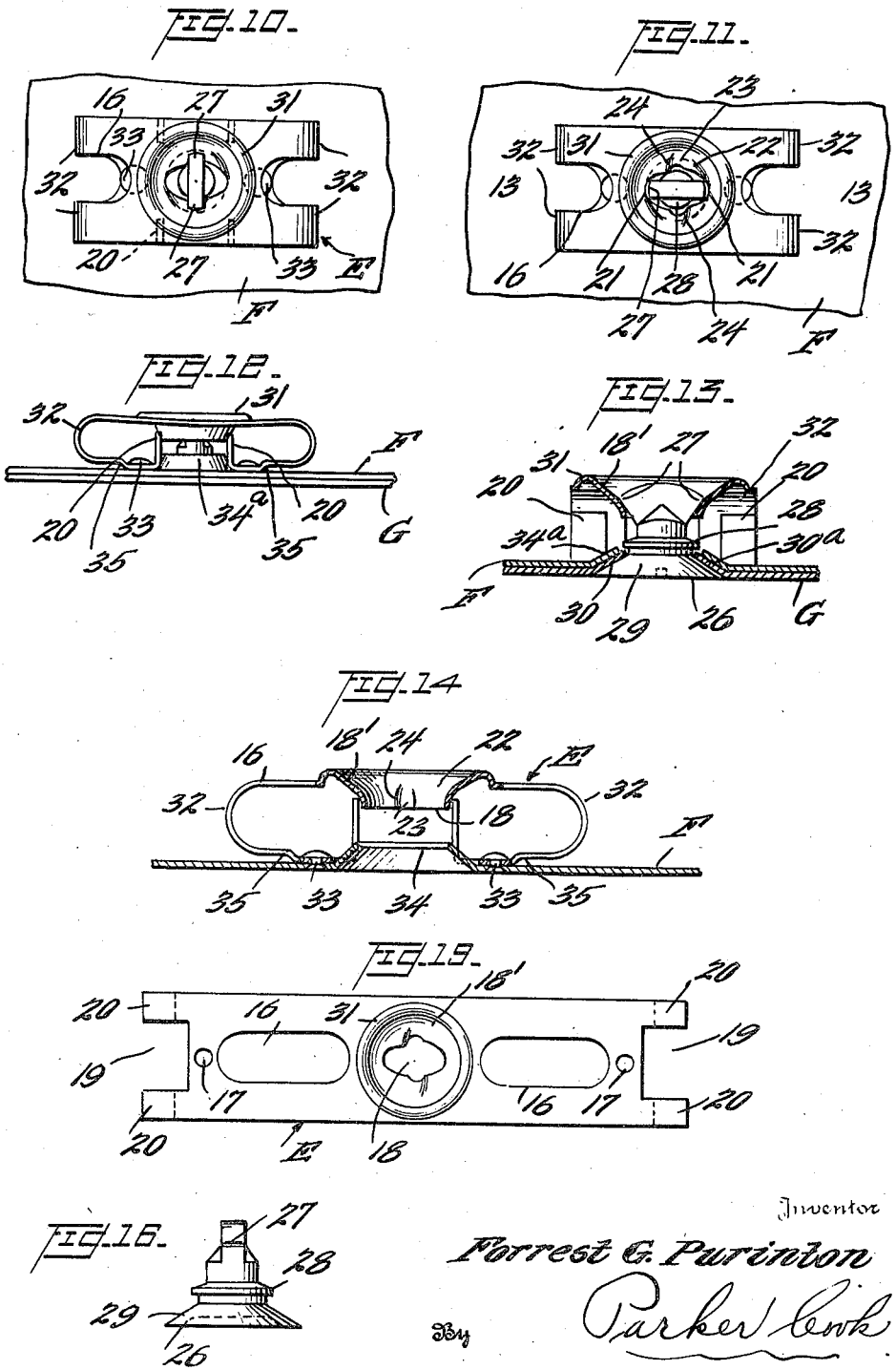

Patented Aug. 24, 1943

2,327,555

UNITED STATES PATENT OFFICE 2,327,555

FASTENER

Forrest G. Purinton, Waterbury, Conn., assignor to The Patent Button Company, Waterbury, Conn., a corporation of Connecticut Application August 29, 1942, Serial No. 456,682

17 Claims. (Cl. 24—221)

My invention relates to new and useful improvements in fasteners, and more particularly to a fastener that is especially adapted to hold two plates together, such as the cowling on airplanes and the like.

There are at least four major considerations or desiderata in a fastener of this kind, the first being a fastener that is strong and efficient in service; second, wherein the fastener will have lasting powers—that is, not wear out within a reasonable time although subjected to constant use; third, a fastener that may be quickly and readily installed and fourth, a fastener that can be manufactured economically and also in a relatively short time.

An object of the invention, therefore, is to provide a fastening means that will meet these four major prerequisites, and also have a number of other advantages which will be disclosed and explained as the specification proceeds.

With these and other objects in view, the invention consists in certain new and novel arrangements and combination of parts as will be hereinafter more fully described and pointed out in the claims.

Referring now to the drawings showing two forms, the first of which is somewhat lighter but not quite so strong as the second, Fig. 1 is a top plan view showing the fastener in its locked position;

Fig. 2 is a similar view but showing the fastener in its unlocked position;

Fig. 3 is a sectional view taken on line 3—3 of Fig. 1;

Fig. 4 is a sectional view taken on line 4—4 of Fig. 1;

Fig. 5 is an enlarged fragmentary view of the spring or socket member showing how the cam and locking surfaces appear;

Fig. 6 is a sectional view of the stud on an enlarged scale;

Fig. 7 is a fragmentary diagrammatic view showing how the spring member cannot be forced beyond its elastic limit;

Fig. 8 is a detail of a hollow rivet before being formed to shape;

Fig. 9 shows a solid rivet which may be shaped to form the stud;

Fig. 10 is a top plan view similar to Fig. 1 showing the heavier and stronger form of fastener and embodying the major principles of the fastener shown in Fig. 1;

Fig. 11 shows the fastener in its unlocked position;

Fig. 12 is a side elevation of the fastener;

Fig. 13 is a sectional view taken on line 13—13 of Fig. 11;

Fig. 14 is an enlarged sectional view taken centrally of Fig. 10 but with the stud removed for the sake of clearness of illustration;

Fig. 15 is a view of the spring member as cut from the stock and before being bent to shape; and Fig. 16 is a detail of the stud.

Referring now to the drawings and for the movement to Figs. 1 to 9 and especially to Fig. 3, there may be seen the two plates A and B which are shown to illustrate the manner in which the fastener is used to hold two plates together.

To the one plate B is fastened the stud or key C. This stud C as shown in Fig. 8 may have the hollow shank 1, the head 2 and the kerf 3, the end of the shank then to be swedged to form the resultant ears 4, as may be seen in Fig. 6.

If desired, however, the stud may have the solid shank 5 and, of course, it will have its end swedged to form ears similar to the hollow form of stud.

To non-removably fasten the stud C to its plate B, I stamp out the plate B as at 6, Fig. 6, the opening being somewhat larger than the diameter of the shank. Then the metal surrounding this hole is dimpled or swedged as at 7 in Fig. 6. The stud in the form shown in Fig. 8 is then inserted in the plate and the hollow end is flattened to form the ears 4, after which there is no possibility of the stud becoming detached from the plate.

It will be understood that if the hollow stud is used in the removable cowl plate the same may be passed through the opening in the plate, and then the hollow end flattened to form ears, this done in the field rather than in the shop.

By placing a screw driver or coin within the kerf 3 it is a simple matter to revolve the stud a quarter turn so that the fastener will be in a locked or unlocked position as will be shortly mentioned.

Referring now to the spring or socket member D, it might be mentioned that it is made of a flat spring steel having arms 8 bent downwardly and inwardly. These inbent arms 8 are then cut out and turned upwardly as at 9 to form stops or feet so that if the spring member is subjected to a severe load which will stress it beyond its elastic limit if it is unrestrained, the spring will bottom on the upper ends of the feet 9 long before the elastic limit is reached and thus before the spring can be harmed by distortion.

Normally these stops do not contact with the under surface of the spring member D, as may be seen in the several views. However, by extending the stops upwardly to provide a clearance of about one thirty-second ($\frac{1}{32}$) of an inch, the spring may normally flex but an overloading beyond its elastic limit will be prevented.

As may be seen in Fig. 3, rivets 10 can be used to hold the spring member D to its plate A, as a header can easily be placed in the space between the under surface of the plate D and the rivet heads.

Referring now to one of the principal features and advantages of the fastener, reference is made to Fig. 5 where will be seen formed in the spring D the entrance notches 11, the advancing cam surfaces 12, the locking sockets 13 and the final stops 14. It will be understood that the two series of formations just listed are respectively alike but oppositely positioned, so that the oppositely positioned ears on the stud will enter like notches, advance on like cam surfaces and fit in like sockets.

These notches, advancing cam surfaces, sockets and stops may all be formed in the one operation by using a die that will cut out a center opening, swedge the peripheral metal walls downwardly about the opening and at an angle corresponding to the bevelled angle of the ears. Then, after the stud is once passed through the elongated opening 15 in the plate A, which opening may be seen in dotted lines in Figs. 1 and 2 and follows in outline the socket opening and is located directly beneath the same, a quarter turning of the stud from the position shown in Fig. 2 (anti-clockwise) to the position shown in Fig. 1 will flex the spring as the ears ride over the advancing cam surfaces and tightly pull the plates together. A full quarter rotation of the stud will therefore cause the ears to snap within their sockets 13 to thus hold the spring in a flexed position, and hold the two plates A and B tightly together.

The stops 14 of course prevent more than a quarter turn of the stud, as will be readily appreciated.

After the stud with its opposite ears is set in the sockets the ears will never jar or work therefrom and will necessitate an intentional retrograde turning of the stud by a tool placed in the kerf thereof to unlock the fastener.

The walls about the opening 15 of the plate A will be swedged to nest the swedged wall 7 in the plate B so that the two plates, of course, will fit tightly together.

By forming the stud with its oppositely disposed ears and by forming the advancing cam surfaces and sockets in the spring member on the angular walls as mentioned, it will be seen that there is a maximum of contact of metal between the two parts. There will be no galling or appreciable wearing effect by the turning of the stud and by so constructing the stud and socket, both members should last throughout the life of the plates to which they are attached.

Also, by providing the stops adjacent the sockets, there is no possibility of turning the stud more than the desired quarter turn, which is, of course, necessary, as should the stud make, say, a half turn, the fastener would be in an unlocked position.

It will also be seen that after providing the forming tools or dies it is a relatively simple matter to accurately press or form the notches, cam surfaces, sockets and stops within the spring member, thus making for a fastener that can be stamped out quickly and in large quantities.

Referring now to the form shown in Figs. 10 to 16, the same form of entrance notches, advancing cam surfaces, sockets and stops, together with the posts for limiting the flexing of the spring, are used but the spring member is shaped differently and has several additional features, which are of great advantage when building a fastener of greater strength and durability.

Referring specifically now to Fig. 15, I preferably stamp out of one inch coil strip steel the spring socket member E. In this spring there will be cut the elongated slots 16, the holes 17 for the rivets, the central opening 18 and the open ended slots 19, these latter slots forming the stops 20 when the spring is bent to shape, as will be shortly mentioned.

The center opening (socket) will have the downwardly extending peripheral walls 18' as in the other form and, of course, will be provided with the entrance notches 21, advancing cam surfaces 22, sockets 23 and stops 24, exactly as the form shown in Fig. 5.

Additionally, there will be stamped upon the spring member about the socket (opening) 18 the ring 31, the inner walls of which merge with the walls 18' as mentioned, and on which walls are formed the advancing cam surfaces, sockets and stops, etc.

As shown in Fig. 14 the spring member E will be bent to shape to have the downwardly and re-entering arms 32 while the portions 20 will be bent upwardly to form stops so that the body portion of the spring may bottom on these four stops if too great a pull is placed on the same. Rivets 33 are shown as securing the spring member E to its plate F and there will, of course, be a circular opening 34 formed in the plate F in registry with the socket 18.

The diameter of the opening 34 will be great enough to let the ears of the solid type of stud shortly to be mentioned pass therethrough regardless of their rotative position, and up into the entrance notches formed in the spring member E.

The metal as at 35 in the bottom of the spring arms may be slightly offset as may be clearly seen in Fig. 14.

By forming the four stops or feet and spacing them about the center opening 18 any excess flexing of the spring will be prevented to thus avoid loading the spring beyond its elastic limit.

Also the formation of this raised integral ring 31 has served several useful purposes. First, it prevents the distortion of the metal at the sides of the spring stock when drawing down the walls about the center opening and in forming the sockets, stops and cam surfaces. The ring is preferably $1\frac{3}{8}$ in diameter and it is to be remembered that the stock metal itself is only one inch in width.

When the forming comes so near the two sides of stock strip there is practically no room to hold the metal with flat tools during the drawing operation, but by providing the stamped ring, mating grooved tools may be used to better hold the stock and thus prevent the sides from pulling in as the center is drawn down.

Again, this stamped ring also serves to strengthen the center portion and helps to confine the resiliency to the bent ends or arms.

Thus, by using a spring formed of coil steel one inch in width and forming the arms and ring as shown, I can obtain an initial holding power of fifty pounds, which is also a desired requirement in a fastener of this kind.

It will be understood that although it is preferable to have a stamped up ring 31 as shown, the raised portions might be in the form of segments or parallel lines or other configurations about the socket to thus strengthen the walls about the same.

The stud 26 is preferably made from a solid rivet with the two oppositely disposed ears 27. There is a flange 28 on its shank, and the usual head 29, so that as the stud is passed through an opening 30 (Fig. 13) in its plate G the surrounding walls 30a will be swedged or rimmed under the flange 28 so that the stud after once being fixed in its plate cannot be lost therefrom.

Likewise the plate F to which the spring member is riveted will have its walls 34a about the opening 34 swedged to nest on the aforementioned walls 30a.

From the foregoing it will be seen that I have devised a fastened which is not only strong and serviceable when first installed, but under ordinary conditions will give far longer service than other forms of fasteners now in use, due to the fact that there is a maximum amount of surface presented between the angular resilient walls of the socket and its contacting stud.

Thus, even after continued use, it will not be necessary to install new studs or cut out the rivets and install new socket members.

Also, where the lighter metal is used for the spring member this spring may have but two stops or feet on which the spring may bottom when put under tension, and the raised ring on the face of the spring may be dispensed with.

However, when the spring member with four feet or stops is used, the stops straddling the conical part of the socket which is formed in the plate to receive the head of the stud will cause the spring member in case of an overload to bottom as near the center as is possible. Also, the ring member adds rigidity and serves to stiffen the center portion and confine resiliency to the bent arms.

Again, by stamping in the ring or like raised portion the stock can be better held in forming so that the sides will be prevented from being drawn down as the center socket is pressed to shape.

Finally, it will be seen that by using openings in both the fixed and the movable cowl plates, greater than the distance across the swedged ears of the stud, these ears may be swedged in the manufacturing instead of in the field when assembling.

It is also to be understood that although I have shown in both types of fastener the ends of the arms being bent upwardly to form stops to prevent an overloading of the spring, it is obvious that other forms of stops might be employed, such as lengthening the depth of the socket so that it might bottom on the plate to which it is fastened and thus prevent an overloading of the spring.

Many slight changes might be made without departing from the spirit and scope of the invention.

Having thus described my invention, what I claim as new and desire to secure by Letters Patent is:

1. In a two-part fastener a spring member having a central opening, the walls defining the opening being unbroken and extending downwardly and inwardly, said walls having formed therein oppositely disposed notches, advancing cam surfaces, sockets, and stops, a cooperating stud, the opening adapted to receive the cooperating stud so that a partial rotation of the stud will flex the spring member as it rides over the advancing cam surfaces, the sockets holding the stud against a retrograde movement and the stops limiting the advancing rotative movement of said stud.

2. In a two-part fastener, a flat spring member having a central opening therein, the walls defining the opening being unbroken and extending downwardly and inwardly, said wall having formed therein a notch, an advancing cam surface, a socket and a stop, a cooperating stud, the opening adapted to receive the cooperating stud so that a partial rotation of the stud will flex the spring member as it rides over the advancing cam surface, the socket holding the stud against a retrograde movement and the stop limiting the advancing rotative movement of said stud.

3. In a two-part fastener, a flat spring member having downwardly and inwardly extending integral arms to support the same, the said member having a centrally disposed opening, the walls defining the opening being continuous and extending downwardly, said walls having formed therein a contiguous notch, advancing cam surface, socket and stop extending substantially to one side of a line drawn centrally and longitudinally of the fastener, and a like notch, advancing cam surface, socket and stop on the opposite side of said line, the last-mentioned notch, advancing cam surface, socket and stop being respectively oppositely disposed with relation to those first mentioned, a cooperating stud having oppositely disposed ears, the said opening adapted to receive the cooperating stud and its oppositely disposed ears, so that after the stud is inserted, a partial rotation of the same will flex the spring member as the ears ride over the advancing cam surfaces, the sockets holding the stud against a retrograde movement and the stops limiting the advancing rotative movement of said stud.

4. In a two-part fastener, a flat spring member, including downwardly and inwardly extending arms at its opposite ends, the said member also having a central opening therein, the walls defining the opening being continuous and extending downwardly and inwardly, said walls having formed therein oppositely disposed notches, advancing cam surfaces, sockets and stops, a stud having a head at one end and outwardly extending ears on its other end, the said ears of the stud adapted to pass through the notches in said spring member and ride over the advancing cam surfaces on a partial rotation to thereby place the spring under tension, the sockets holding the stud against a retrograde movement and the stops limiting the advancing rotative movement of said stud.

5. A two-part fastener including in part a relatively flat spring member having arms extending downwardly, inwardly and then upwardly and terminating short of the under surface of the body of the spring member, the body of the spring member having a central opening formed therein, the walls defining the opening being continuous and extending downwardly and inwardly, said walls having formed therein oppositely disposed notches, advancing cam surfaces, sockets and stops, the said opening adapted to receive a cooperating stud and the upwardly extending arms limiting the downward movement of the body of the spring member, 6. A fastener including in part a relatively flat spring member having arms extending downwardly and inwardly, an open socket in said spring member, the walls defining the opening of the socket being continuous and having formed therein oppositely disposed notches, advancing cam surfaces, seats and stops, the said socket adapted to receive a cooperating stud and means for limiting the downward flexing movement of the body of the spring member.

7. A fastener including in part a relatively flat spring member having its ends extending downwardly, inwardly and then upwardly and terminating short of the under surface of the body of the spring member, the body of the spring member having an open integral socket formed therein and the walls of the socket extending below the surface of the body defining the spring member, the walls of the socket having formed therein oppositely disposed notches, advancing cam surfaces, locking sockets and adjacent stops, the said locking sockets adapted to receive and hold a cooperating stud and the upwardly extending ends of the arms limiting the downward movement of the body of the spring member.

8. A fastener including in part a relatively flat spring member having its ends extending downwardly, inwardly and then upwardly, and terminating short of the under surface of the body of the spring member, the body of the spring member having an integral open socket therein midway between the upwardly extending portions of said arms, the said socket extending below the surface of the body of the spring member, the walls defining the open socket being unbroken and having formed therein oppositely disposed notches, advancing cam surfaces, relatively small locking sockets and adjacent stops, and the spring member adapted to receive and hold a cooperating stud and the upwardly extending ends of the arms limiting the downward movement of the body of the spring member.

9. A fastener including in part a relatively flat spring member having a body portion, arms at the ends of the body portion and said arms extending downwardly, inwardly and then upwardly and terminating short of the under surface of the body of the spring member, the body of the spring member having an open bottom socket disposed midway between the upstanding ends of the arms, the walls defining the opening at the bottom of the socket having oppositely disposed advancing cam surfaces, seats and stops adjacent the seats, the said socket adapted to receive and hold a cooperating stud and the upwardly extending ends of the arms limiting the downward movement of the body of the spring member.

10. A fastener including in part a relatively flat spring member, the ends of the spring member extending downwardly, inwardly and then upwardly and terminating a slight distance below the under surface of the said spring member to thereby limit the downward flexing of the same, a depressed socket having a continuous wall formed in the spring member midway between said arms, cam surfaces and seats on the walls of said sockets adapted to cooperate with a rotatable stud to thereby place and hold said spring member under tension.

11. A fastener including in part a spring member formed of a flat metal strip, a socket located centrally of the spring member, the metal about the socket being reinforced, the socket being open at its bottom and the walls defining the openings being continuous and having entrance notches, advancing cam surfaces, seats and stops thereon adapted to receive a cooperating locking stud and means on the spring member for limiting the downward movement of the socket to thus prevent loading the spring member beyond its elastic limit.

12. A fastener including in part a relatively flat spring member comprising a body portion, arms at the ends of the body portion, the said arms being extended downwardly and inwardly, the body of the spring member provided with a socket and the body of the spring member having pressed-up portions thereon and disposed in close proximity to the socket for strengthening the metal about the socket, the said socket having advancing cam surfaces, seats and stops formed thereon, adapted to cooperate with a rotatable stud to thereby place and hold the spring member under tension and means for limiting the downward flexing movement of the body portion of the spring member.

13. A fastener including in part a relatively flat spring member comprising a body portion, downwardly and inwardly extending arms, and the ends of said arms extending upwardly and terminating slightly beneath the under surface of the body of the spring member, a pressed-up ring in the body of the spring member located above the aforementioned upwardly extending ends of the arms, the metal confined with the ring member extending downwardly and perforated at its bottom, the downwardly extending metal being unbroken and forming a socket having advancing cam surfaces, seats and stops formed thereon adapted to cooperate with a rotatable stud to thereby place and hold the spring member under tension.

14. A fastener including in part a relatively flat spring member comprising a body portion, two arms at each end of the body portions, the said arms extending downwardly, inwardly and then upwardly to form four stops, the body of the spring member having an upstanding ring thereon and located centrally over the four stops, the metal confined within the ring member extending downwardly and inwardly and perforated at its bottom, the downwardly extending metal within the ring member forming a socket with continuous walls, the said socket having advancing cam surfaces, seats and stops formed on said wall and adapted to cooperate with a rotatable stud to thereby place and hold the spring member under tension and the four stops limiting the downward movement of the body portion of the spring member.

15. A two-part fastener for holding two plates together including in part a relatively flat spring member comprising a body portion, two arms at each end of the body portion, the said arms being extended downwardly, inwardly and then upwardly to form four stops, the body of the spring member having a pressed-up ring thereon and located centrally over the four stops, the metal within the spring member being pressed downwardly and inwardly and perforated at its bottom, the downwardly extending metal within the ring member forming a socket with continuous walls defining the opening in the bottom, entrance notches, advancing cam surfaces, seats and stops formed on said defining walls and the said spring member being fastened to a plate having an opening registering with said socket, a rotatable stud having outwardly extending ears thereon and said stud permanently fastened to a separate plate, and a quarter turn of said stud after being placed in said entrance notches adapted to flex said spring member and hold the same under tension to thereby hold the two plates together.

16. A two-part fastener including in part a spring member formed of a flat metal strip having an up-pressed ring located centrally of the length and width of the said member, the said spring member having cutout portions on the opposite sides of said ring and the opposite ends of said spring member being centrally notched, the said spring member being adapted to be bent downwardly and inwardly midway between the length of the cutout portions to form resultant arms and the notched end portions of the member being adapted to be bent upwardly to form bottoming stops, the metal confined within the ring being continuous and extending downwardly, perforated at its bottom and having entrance notches, advancing cam surfaces, seats and stops formed thereon and adapted to receive a cooperating locking stud, and the said member adapted to be permanently fastened to a plate.

17. A fastener including in part a relatively flat member comprising a body portion, spring means for resiliently holding the body portion slightly spaced from the article to which it is to be attached, the body of the member having a socket with unbroken walls therein, reinforcing walls formed in the body portion and disposed in close proximity to the periphery of the socket, the said socket having advancing cam surfaces, seats and stops formed thereon and adapted to cooperate with a rotatable stud to thereby place and hold the member under tension.

FORREST G. PURINTON.